US011718990B2

(12) United States Patent
Lim et al.

(10) Patent No.: US 11,718,990 B2
(45) Date of Patent: Aug. 8, 2023

(54) REBAR ANCHORING METHOD

(71) Applicant: Su-I Lim, New Taipei (TW)

(72) Inventors: Su-I Lim, New Taipei (TW); Tien-Lee Yang, Taoyuan (TW)

(73) Assignee: Su-I Lim, New Taipei (TW)

( * ) Notice: Subject to any disclaimer, the term of this patent is extended or adjusted under 35 U.S.C. 154(b) by 0 days.

(21) Appl. No.: 17/811,180

(22) Filed: Jul. 7, 2022

(65) Prior Publication Data

US 2022/0341169 A1 Oct. 27, 2022

Related U.S. Application Data

(62) Division of application No. 17/248,014, filed on Jan. 5, 2021, now Pat. No. 11,414,867.

(30) Foreign Application Priority Data

Nov. 20, 2020 (CN) .......................... 202011308027.9

(51) Int. Cl.
| | |
|---|---|
| *E04C 5/16* | (2006.01) |
| *F16B 31/02* | (2006.01) |
| *F16B 9/00* | (2006.01) |
| *E04C 5/12* | (2006.01) |
| *E04C 5/03* | (2006.01) |

(52) U.S. Cl.
CPC ................ *E04C 5/162* (2013.01); *E04C 5/03* (2013.01); *E04C 5/12* (2013.01); *E04C 5/125* (2013.01); *E04C 5/165* (2013.01); *F16B 9/056* (2018.08); *E04C 5/161* (2013.01); *F16B 31/021* (2013.01)

(58) Field of Classification Search
CPC .......... E04C 5/162; E04C 5/125; E04C 5/165; E04C 5/161; E04C 5/03; E04C 5/12; F16B 9/056; F16B 31/021
USPC ........................... 52/831, 698, 834, 848, 849
See application file for complete search history.

(56) References Cited

U.S. PATENT DOCUMENTS

| 3,369,334 A * | 2/1968 | Berg .......................... E04B 1/06 |
| | | 52/223.13 |
| 10,309,221 B2 * | 6/2019 | Craig .................... E21D 21/008 |

FOREIGN PATENT DOCUMENTS

| KR | 20130025524 A | * | 9/2011 | ................ F16B 7/18 |
| KR | 20150029782 A | * | 9/2013 | ............. E04C 5/162 |

* cited by examiner

*Primary Examiner* — Brent W Herring
(74) *Attorney, Agent, or Firm* — Wang Law Firm, Inc.

(57) ABSTRACT

A rebar anchoring system and method are provided. The system includes: a rebar, with an external thread formed on the periphery of at least one end; an anchoring head, with a first perforation and a second perforation disposed respectively at both ends extending axially into the anchoring head and communicating with each other, the inner sides of the first and second perforations being formed respectively with a first internal thread matching with the external thread of the rebar and a second internal thread, and the anchoring head being mounted on the end of the rebar through the first internal thread and the external thread of the rebar; and a bolt, having a screw rod matching with the second internal thread, the screw rod being locked into the second perforation of the anchoring head, and the end of the screw rod pressing against the end of the rebar.

4 Claims, 4 Drawing Sheets

REBAR ANCHORING METHOD

CROSS-REFERENCE TO RELATED APPLICATION

This application is a Divisional of U.S. application Ser. No. 17/248,014, filed on Jan. 5, 2021, which claims priority of Chinese patent application No. 202011308027.9, filed on Nov. 20, 2020, which is incorporated herewith by reference.

BACKGROUND OF THE INVENTION

1. Field of the Invention

The present invention relates generally to the field of construction engineering, and more particularly, to a rebar anchoring system and method.

2. The Prior Arts

Reinforced concrete structures have excellent mechanical strength due to the combination of the compression resistance properties of concrete materials and the tensile properties of reinforced steel bars (i.e., rebar), and are therefore widely used in tall buildings, houses, bridges, roads, slopes, etc. building construction project or infrastructure construction.

When constructing a reinforced concrete structure, it is necessary to pre-bundle a plurality of rebar into beams, columns and other structural shapes according to the design of the building, and perform concrete grouting operations after setting the template. The rebar at the joints of the structural bodies such as beams and columns require an anchor structure to firmly bond the rebar to the dried concrete. The conventional anchoring structure of rebar is as shown in FIG. 1A and FIG. 1B. One end of the rebar A is bent into an L-shaped hook A1 or a U-shaped hook A2. When the concrete is poured and dried, the bending hook A1 or A2 is anchored to concrete and fixed.

However, the aforementioned conventional rebar hook anchoring method has the following disadvantages:

1. Due to the need to reserve the length for forming the hook, the required length of the rebar is longer, which increases the cost of the rebar material, especially the larger the number of rebar, the longer the lapping length, the higher the cost.

2. Most of the rebar are bundled into the steel structure after forming a hook, which will increase the congestion of the rebar, thereby restricting the fluidity of concrete pouring between the thick bundles. In particular, the beam-column joint is one of the most congested parts of the reinforcement configuration in reinforced concrete buildings, and is subject to many restrictions during construction.

3. The hook will restrain the arrangement of the rebar and increase the cost of steel work.

4. Before the concrete is poured, the rebar hooks bundled into the steel structure are in a state of protruding, and the exposed rebar increase the risk of the construction site.

The beam-column joint is the intersection of the column member and the beam member. It is one of the most complex elements in the structure, especially for the beam-column joints of side columns, corner columns, top-level columns, discontinuous beams or column members. When the traditional construction method needs to meet the seismic design requirements, the configuration of the rebar in the intersection is more crowded because the ends of the main reinforcement are anchored by bending hooks, and the steel hooks are anchored toward the core of the intersection; therefore, the construction is difficult. As a result, the quality of concrete pouring is poor, which further raises doubts whether the strength of beam-column joints can be guaranteed.

To solve the aforementioned shortcomings in the anchoring structure of the rebar hook, at present, the enlarged-head rebars have been used to replace the traditional hook anchoring shape, which can not only shorten the embedded length of the rebar, but also reduce the crowded rebar at beam-column joints caused by rebar hook so as to improve the construction quality of beam-column joints.

In addition, in recent years, with the aging population in Taiwanese society, the labor force for construction projects has gradually decreased, leading to an increase in direct labor costs, and even a shortage of labor, resulting in an increase in indirect time costs and an increase in uncertainty in the construction period. The issue can be improved by adopting the precast construction method, especially for the improvement of the construction period. The precast construction method can be widely applied to various projects. Considering the convenience of component transportation, the column members and beam members are produced in the factory by the precast construction method respectively, and then transported to the construction site for assembly and binding of the rebars in the beam-column intersection area and finally pouring concrete on site, which is the most commonly used combination method in the precast construction method.

The overlapping configuration of the enlarged-head rebar used in the precast construction method can be divided into two types: vertical overlapping and horizontal overlapping. The enlarged-head rebar in the beam-column joints can effectively reduce the congestion of the rebars caused by the rebar hooks at the end and improve the quality of concrete pouring, which also helps for the application of the precast construction method. Therefore, in the precast construction work method, the use of enlarged-head rebar instead of traditional hooks at the end of rebar has the following advantages:

1. It helps to alleviate the congestion of the rebars caused by the hooks and improve the quality of concrete pouring;

2. The lashing operation of the enlarged-head rebar is simple, which can reduce working hours;

3. When applied to large rebar, the production cost of the enlarged-head is more economical than the cost of hook rebar;

4. The use of the enlarged-head can shorten the embedded length of the rebar, make the size of the concrete member and the configuration of the rebar more flexible;

5. The enlarged-head rebar must be cut and flattened during production, and the accuracy is higher, and because of the convenience of on-site construction, the wide application helps to improve the construction accuracy of concrete structures;

6. The use of the enlarged-head can improve the construction quality of the concrete structure in the intersection area of precast concrete beams and columns on site.

The enlarged-head rebar is called T-head rebar because of the shape. The common T-head rebars in the industry are shown in FIG. 3. There are three types of production methods of the enlarged-head, including:

1. Welded-type enlarged-head rebar: Because the rebar is welded with the enlarged-head by welding, high-strength rebar with high carbon equivalent (CE) is not suitable for electric welding. Rebar with general strength exceeding SD490 is not suitable for welding processing. Welded rebars with enlarged-head can be further divided into steel-plate welded rebars and screw-welded rebars according to the form of objects welded to the rebar. As shown in FIG. 2A, the steel-plate welded rebar is to weld steel plate B of appropriate thickness to the rebar A through directly friction-welding. The friction between the two steel parts generates high heat, which can melt and join the two steel parts in tens of seconds without additional welding material. The shape of the steel plate used as enlarged-head is usually round or rectangular. As shown in FIG. 2B, the screw-welded rebar with enlarged-head is to directly weld a screw C with external threads to the rebar A in the axial direction, and steel plate B used as enlarged-head is machined with internal thread to lock with the screw C. The welded rebar with enlarged-head is complicated and high in cost.

2. Hot-rolled type enlarged-head rebar: As shown in FIG. 2C, the hot-rolled enlarged-head rebar is made by using equipment to heat the end of the rebar A to a molten state, and then extrude the end of the rebar to form an enlarged-head A3 by forging to form a one-piece rebar with enlarged-head. The production of the enlarged-head at the end of the rebar requires special attention to the influence of heat treatment on the unfavorable factors of the high-strength rebars, and the enlargement process is complicated and high in cost.

3. Grouting type enlarged-head rebar: This type of enlarged-head rebar are suitable for threaded joint rebars, which use a coarse threaded sleeve containing a enlarged-head end plate to lock the threaded joint rebar, and then execute high-strength mortar pouring. The gap between the rebar and the sleeve is filled with mortar, and the high consolidation strength of the mortar is used to make the formed enlarged-head rebar provide the anchoring strength for repeated tension and compression to avoid sliding between the rebar and the sleeve. However, the manufacturing process of this type of enlarged-head rebar is cumbersome and costly.

SUMMARY OF THE INVENTION

A primary objective of the present invention is to provide a rebar anchoring system and method that can easily and cost-effectively form an enlarged-head of rebar, and provide excellent firmness between the enlarged-head and the rebar.

The rebar anchoring system provided by the present invention includes: a rebar, with an external thread formed on the periphery of at least one end thereof; an anchoring head, with a first perforation disposed at an axial end extending axially into the inside of the anchoring head and a second perforation communicating with the first perforation being disposed at the other axial end extending axially into the inside of the anchoring head, the inner side of the first perforation being formed with a first internal thread matching with the external thread of the rebar, the inner side of the second perforation being formed with a second internal thread, and one end of the anchoring head being mounted on the end of the rebar through the first internal thread matching with the external thread of the rebar; and a bolt, having a screw rod matching with the second internal thread of the anchoring head, the screw rod being locked into the second perforation from the other end of the anchoring head, and the end of the screw rod pressing against the end of the rebar. With the anchoring system, when the screw rod presses against the end of the rebar with a force, the end of the rebar will bear an axial pressure, so that the anchoring head will generate an axial tension on the rebar so that the rebar generates a pretension and can be firmly combined with the anchoring head.

In a preferred embodiment of the present invention, an annular groove surrounding the circumference of the screw rod is formed at a position on the outer surface of the screw rod around central axis, and the diameter of the bottom surface of the annular groove is smaller than the outer diameter of the screw rod. Thereby, when the torque applied to the bolt exceeds a predetermined value, the screw rod can be broken along the annular groove, thereby assisting the construction personnel to quickly determine whether the bolt applies a predetermined force to the rebar.

Preferably, the anchoring head has a radial net cross-sectional area larger than four times of the radial cross-sectional area of the rebar. Thereby, under the economic principle, the anchoring head has the best anchoring effect for the concrete structure.

In a preferred embodiment of the present invention, a segment of the rebar with external thread is formed in the shape of a round rod or a tapered rod, and the first perforation of the anchoring head is formed to have a shape of round hole or tapered hole to match the shape of the round rod or tapered rod respectively.

Preferably, the first perforation and the second perforation formed at both ends of the anchoring head are linearly aligned in the axial direction, so that the screw rod can apply force to the end of the rebar most efficiently.

The present invention also provides a rebar anchoring method, including: providing a rebar, and forming an external thread on the periphery of at least one end of the rebar; combining the rebar with other rebars to form a rebar structure, and having the rebar with external thread extending into the rebar structure of the trench; providing an anchoring head, the anchoring head having a first perforation disposed at an axial end extending axially into the inside of the anchoring head and a second perforation communicating with the first perforation being disposed at the other axial end extending axially into the inside of the anchoring head, the inner side of the first perforation being formed with a first internal thread matching with the external thread of the rebar, the inner side of the second perforation being formed with a second internal thread, and one end of the anchoring head being mounted on the end of the rebar through the first internal thread matching with the external thread of the rebar; providing a bolt, the bolt having a screw rod matching with the second internal thread of the anchoring head, locking the screw rod into the second perforation from the other end of the anchoring head, when the end of the screw rod being pressed against the end of the rebar, applying a torque to the bolt so that the screw rod continuing to exert a longitudinal pressure on the end of the rebar, so that the anchoring head exerting a longitudinal tension on the rebar for the anchoring head and the rebar to mutually fix; and grouting by pouring mixed concrete water into the rebar structure so that the anchoring head being anchored when the concrete dried and hardening.

In an embodiment of the rebar anchoring method, an annular groove surrounding the circumference of the screw rod is formed at a position on the outer surface of the screw rod around central axis, and the diameter of the bottom surface of the annular groove is smaller than the outer diameter of the screw rod; when the torque applied to the bolt exceeds a predetermined value, the screw rod is broken along the annular groove, thereby assisting the construction personnel to quickly determine whether the bolt applies a predetermined force to the rebar. Thereby, when the torque applied to the bolt exceeds a predetermined value, the screw rod can be broken along the annular groove, thereby assisting the construction personnel to quickly determine whether the bolt applies a predetermined force to the rebar.

In an embodiment of the rebar anchoring method, the anchoring head has a radial net cross-sectional area larger than four times of the radial cross-sectional area of the rebar. Thereby, under the economic principle, the anchoring head has the best anchoring effect for the concrete structure.

In an embodiment of the rebar anchoring method, a segment of the rebar with external thread is formed in the shape of a round rod or a tapered rod, and the first perforation of the anchoring head is formed to have a shape of round hole or tapered hole to match the shape of the round rod or tapered rod respectively.

In an embodiment of the rebar anchoring method, the first perforation and the second perforation formed at both ends of the anchoring head are linearly aligned in the axial direction, so that the screw rod can apply force to the end of the rebar most efficiently.

The present invention enables the construction workers to quickly assemble the anchoring head with the rebar to obtain a firm fixing effect through the aforementioned rebar anchoring system and method. In addition, the construction workers can quickly determine whether the screw rod is broken or not when the bolt is locked so as to determine whether the bolt exerts a predetermined force on the rebar, thereby saving the cost of manpower inspection and testing.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1A:
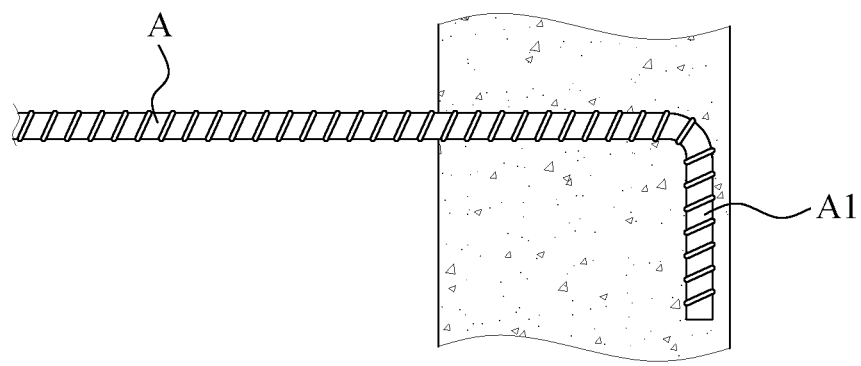
FIG. 1A is a schematic view showing the end of a conventional rebar bent into an L-shaped hook.
Figure 1B:
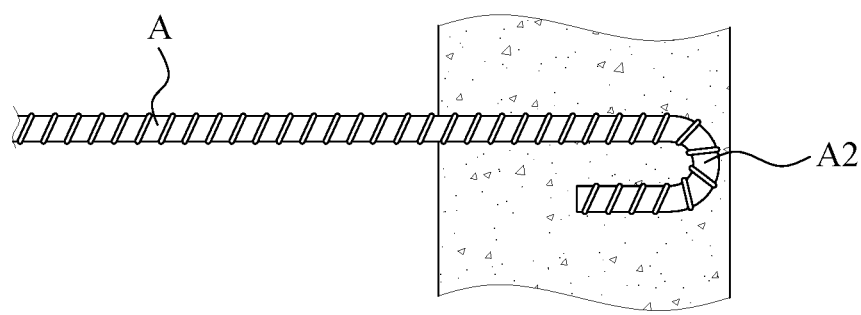
FIG. 1B is a schematic view showing the end of a conventional rebar bent into a U-shaped hook.
Figure 2A:
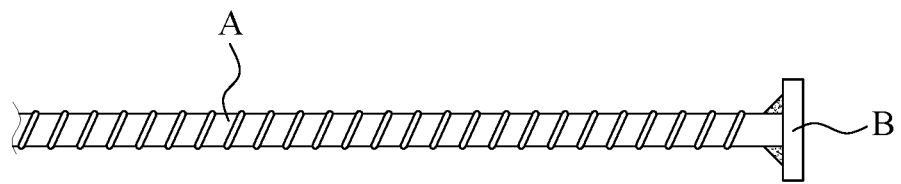
FIG. 2A is a schematic view showing the end of the conventional rebar directly welded to a steel plate to form an enlarged head.
Figure 2B:
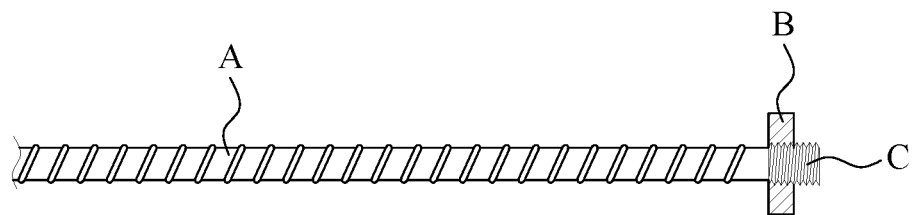
FIG. 2B is a schematic view showing the end of the conventional rebar welded with a screw, and then locking the screw into a steel plate to form an enlarged head.
Figure 2C:
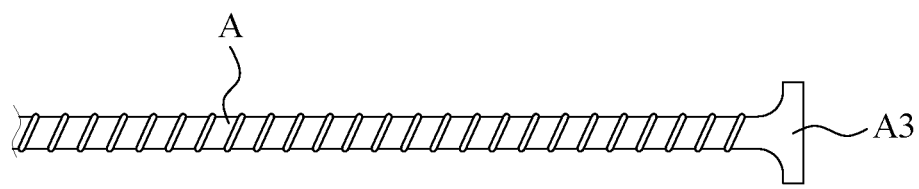
FIG. 2C is a schematic view showing the end of a conventional rebar heated to a molten state and then extruded by forging to form an enlarged head.
Figure 3:
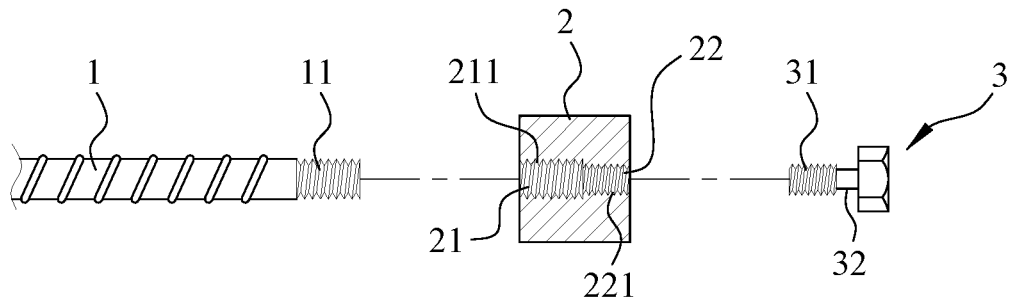
FIG. 3 is an exploded cross-sectional view showing the combination of the main elements of the rebar anchoring system of the present invention.
Figure 4:
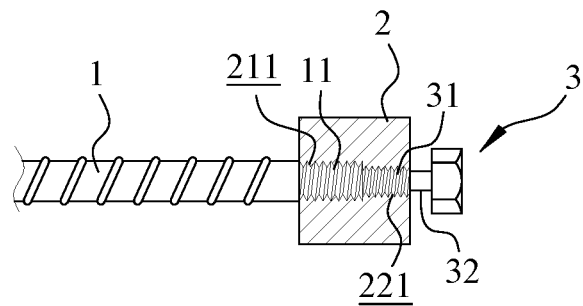
FIG. 4 is a cross-sectional view showing the structure of the rebar anchoring system of the present invention.
Figure 5:
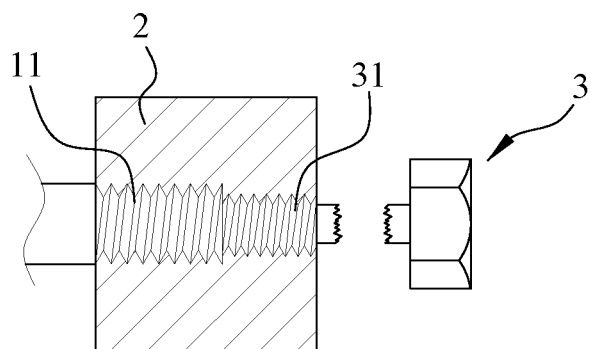
FIG. 5 is a schematic view showing the bolt of the rebar anchoring system of the present invention applied with a torque exceeding a predetermined value, causing the screw rod to break.

As shown in FIG. 3, the preferred embodiment of the rebar anchoring system provided by the present invention includes: a rebar 1, an anchoring head 2, and a bolt 3.

Wherein, an external thread 11 is formed on the periphery of at least one end of the rebar 1 through processing.

A preferred embodiment of the anchoring head 2 is a round cylindrical body. The anchoring head 2 has a first perforation 21 disposed at an axial end extending axially into the inside of the anchoring head 2 and a second perforation 22 communicating with the first perforation 21 disposed at the other axial end extending axially into the inside of the anchoring head 2, and preferably, the first perforation 21 and the second perforation 22 are linearly aligned in the axial direction. The inner side of the first perforation 21 is formed with a first internal thread 211 matching with the external thread 11 of the rebar 1, and the inner side of the second perforation 22 is formed with a second internal thread 221 to lock the bolt 3. Therefore, one end of the anchoring head 2 is mounted on the end of the rebar 1 through the first internal thread 211 matching with the external thread 11 of the rebar 1.

The bolt 3 has a screw rod 31 matching the second internal thread 221 of the anchoring head 2, and the screw rod 31 is locked into the second perforation 22 from the other end of the anchoring head 2. Preferably, in the present invention, an annular groove 32 surrounding the circumference of the screw rod 31 is formed on the outer surface of the screw rod 31 at a position along the length of the central axis, and the bottom diameter of the annular groove 32 is smaller than the outer diameter of the screw 31 rod. For example, the annular groove 32 may be located at the root of the screw rod 31 adjacent to the head of the bolt. More specifically, the radial net cross-sectional area of the anchoring head 2 after deducting the radial area of the first perforation 11 is more than four times of the radial cross-sectional area of the rebar 1.

A segment of certain length of the rebar 1 with the external thread 11 can be formed in the shape of a round rod or a tapered rod. When the area of the external thread 11 of the rebar 1 is in the shape of a round rod, the first perforation 21 of the anchoring head 2 is formed into a shape of round hole to match with the shape of the round rod; when the area of the external thread 11 of the rebar 1 is a tapered rod shape, the first perforation 21 is formed into a shape of tapered or cone hole to match with the shape of the tapered rod.

With the aforementioned rebar anchoring system, when the anchoring head 2 is screwed to the rebar 1, the anchoring head 2 is actually only held on the rebar 1 without being completely fixed. When the screw rod 31 of the bolt 3 is further locked into the second perforation 22 of the anchoring head 2 and a torsion force is applied to the bolt 3 so that the end of the screw rod 31 is pressed against the end of the rebar 1 with an axial pressure, the anchoring head 2 screwed to the rebar 1 will exert a reverse pulling tension to the rebar 1 correspondingly. Therefore, the opposite axial pressure and pulling tension acting on the rebar 1 make the rebar 1 generate a pretension force, so that the anchoring head 2 is firmly fixed to the rebar 1 and will not be loosened by external forces, such as earthquakes.

More specifically, since the radial cross-sectional area of the part of the screw rod 31 at the corresponding annular groove 32 is smaller than the radial cross-sectional area of the rest of the screw rod 31, the strength of the radial cross section of the part of the screw rod 31 at the corresponding annular groove 32 is less than the strength of the radial cross section of the rest of the screw rod 31. Thereby, when the bolt 3 is locked into the second perforation 22 of the anchoring head 2 by the screw rod 31 and the screw rod 31 is in contact with the end of the rebar 1, if a torque is applied to the bolt 3 continuously and when the applied torque exceeds the preset torque value of the part of the screw rod 31 at the annular groove 22, the torque will cause the screw rod 31 to break along the annular groove 32. As such, the construction workers or inspectors can quickly determine whether the bolt 3 has already locked the anchoring head 2 into the rebar 1. In other words, if the screw rod 31 is unbroken, it means that the torque applied by the screw rod 31 is insufficient, and it is necessary to continue to apply the torque until the screw rod 31 breaks to obtain sufficient torque.

Figure 6:
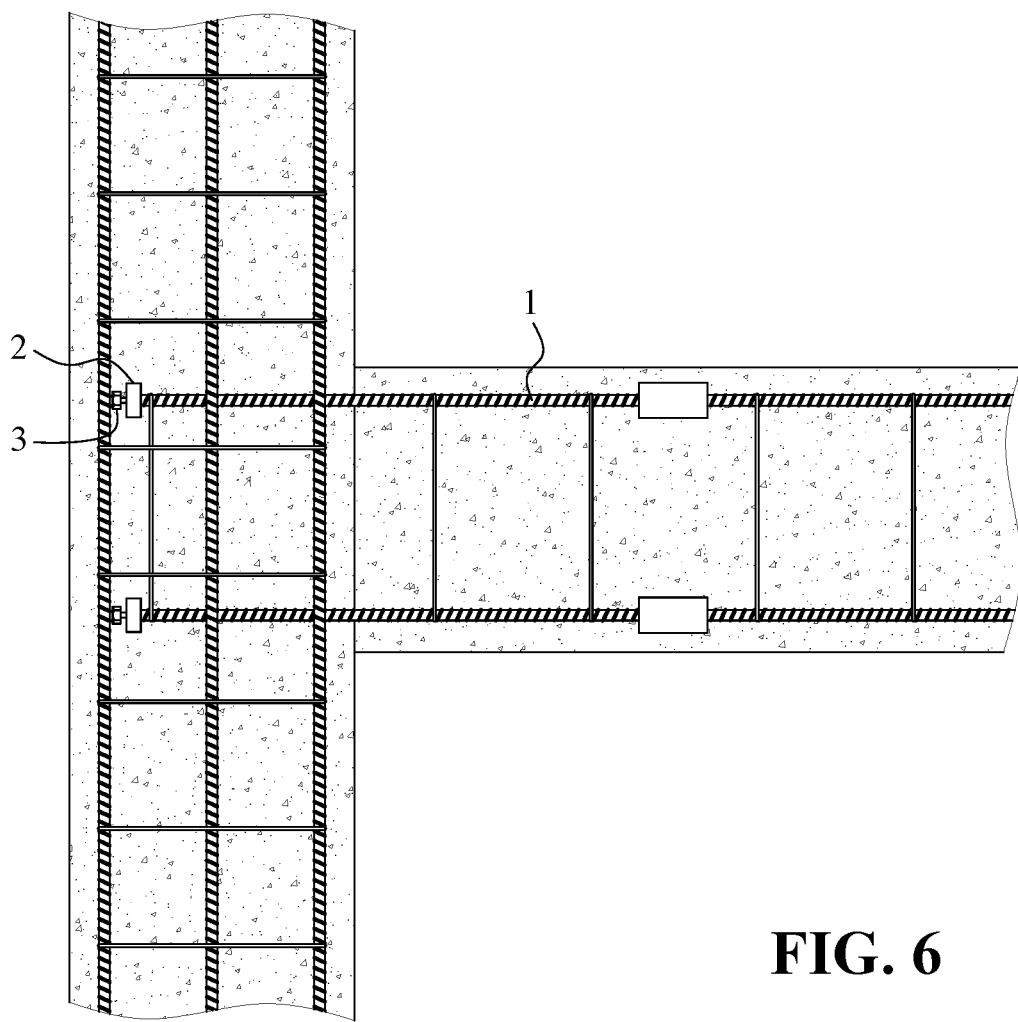
FIG. 6 is a schematic view showing an embodiment of the rebar anchoring system of the present invention applied to the T-shaped beam-column joint.

As shown in FIG. 6, when the aforementioned rebar anchoring system is applied to the T-shaped beam-column joint or even other construction projects, the plural rebars 1 are bundled into a rebar structure, such as a column or a beam. The end of the rebar 1 to be anchored has been pre-formed with external threads, and then the internal thread of the first perforation of the anchoring head 2 is locked to the external thread of the rebar 1, and then a tool is used to bolt the bolt 3 to enter the second perforation 22 of the anchoring head 2 to lock the anchoring head to the rebar 1. Finally, the grouting process by pouring mixed concrete water is performed.

The present invention also provides a rebar anchoring method, applicable to the aforementioned rebar anchoring system, including the steps of:

Providing a rebar, and forming an external thread on the periphery of at least one end of the rebar;

Combining the rebar with other rebars to form a rebar structure, and having the rebar with external thread extending into the rebar structure of the trench;

Providing an anchoring head, the anchoring head having a first perforation disposed at an axial end extending axially into the inside of the anchoring head and a second perforation communicating with the first perforation being disposed at the other axial end extending axially into the inside of the anchoring head, the inner side of the first perforation being formed with a first internal thread matching with the external thread of the rebar, the inner side of the second perforation being formed with a second internal thread, and one end of the anchoring head being mounted on the end of the rebar through the first internal thread matching with the external thread of the rebar;

Providing a bolt, the bolt having a screw rod matching with the second internal thread of the anchoring head, locking the screw rod into the second perforation from the other end of the anchoring head, when the end of the screw rod being pressed against the end of the rebar, applying a torque to the bolt so that the screw rod continuing to exert a longitudinal pressure on the end of the rebar, so that the anchoring head exerting a longitudinal tension on the rebar for the anchoring head and the rebar to mutually fix; and grouting by pouring mixed concrete water into the rebar structure so that the anchoring head being anchored when the concrete dried and hardening.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A rebar anchoring method, comprising the steps of:
providing a rebar, and forming an external thread on the periphery of at least one end of the rebar;
combining the rebar with other rebars to form a rebar structure, and having the rebar with external thread extending into the rebar structure;
providing an anchoring head, the anchoring head having a first perforation disposed at an axial end extending axially into the inside of the anchoring head and a second perforation communicating with the first perforation being disposed at the other axial end extending axially into the inside of the anchoring head, the inner side of the first perforation being formed with a first internal thread matching with the external thread of the rebar, the inner side of the second perforation being formed with a second internal thread, and one end of the anchoring head being mounted on the end of the rebar through the first internal thread matching with the external thread of the rebar;
providing a bolt, the bolt having a screw rod matching with the second internal thread of the anchoring head, locking the screw rod into the second perforation from the other end of the anchoring head, when the end of the screw rod is pressed against the end of the rebar, applying a torque to the bolt so that the screw rod continues to exert a longitudinal pressure on the end of the rebar, so that the anchoring head exerts a longitudinal tension on the rebar for the anchoring head and the rebar to mutually affix; and
grouting by pouring mixed concrete water into the rebar structure so that the anchoring head anchors securely when the concrete dries and hardens;
wherein an annular groove surrounding the circumference of the screw rod is formed at a position on the outer surface of the screw rod around a central axis, and the diameter of the bottom surface of the annular groove is smaller than the outer diameter of the screw rod; when the torque applied to the bolt exceeds a predetermined value, the screw rod is broken along the annular groove.

2. The rebar anchoring method according to claim 1, wherein the anchoring head has a radial net cross-sectional area larger than four times of the radial cross-sectional area of the rebar.

3. The rebar anchoring method according to claim 1, wherein a segment of the rebar with external thread is formed in the shape of a round rod or a tapered rod, and the first perforation of the anchoring head is formed to have a shape of a round hole or a tapered hole to match the shape of the round rod or tapered rod respectively.

4. The rebar anchoring method according to claim 1, wherein the first perforation and the second perforation formed at both ends of the anchoring head are linearly aligned in the axial direction.

* * * * *